W. P. MURPHY.

CAR END BRACE.

APPLICATION FILED SEPT. 24, 1918.

Reissued Oct. 29, 1918.

14,544.

2 SHEETS—SHEET 1.

Inventor:
Walter P. Murphy
By Barnett & Truman
Attys.

W. P. MURPHY.

CAR END BRACE.

APPLICATION FILED SEPT. 24, 1918.

Reissued Oct. 29, 1918.

14,544.

2 SHEETS—SHEET 2.

Inventor:
Walter P. Murphy
By Barnett & Truman
Attys

UNITED STATES PATENT OFFICE.

WALTER P. MURPHY, OF NEW YORK, N. Y.

CAR END-BRACE.

14,544. Specification of Reissued Letters Patent. Reissued Oct. 29, 1918.

Original No. 1,152,202, dated August 31, 1915, Serial No. 870,489, filed November 5, 1914. Application for reissue filed September 24, 1918. Serial No. 255,414.

*To all whom it may concern:*

Be it known that I, WALTER P. MURPHY, a citizen of the United States, and a resident of the city of New York, in the county of New York and State of New York, have invented a new and useful Improvement in Car End Braces, of which the following is a specification.

This invention relates to the end framing of wooden box cars, and particularly to means for repairing damaged cars and for strengthening old style cars to fit them for present day service conditions.

The principal object of the invention is a metal brace construction for attachment to the end of a wooden car outside the sheathing to keep it from being knocked out by shifting lading.

A further object of the invention is an arrangement of parts which can be readily applied to cars already built, and which will coöperate with the car side and end framing to prevent distortion thereof and to stiffen the roof.

The invention further consists in a metal brace for attachment in the end of a car for the purposes above set forth, and in the parts and arrangements hereinafter described and claimed.

The accompanying drawings illustrate an embodiment of the invention applied to a wooden car of ordinary construction.

Figure 1:
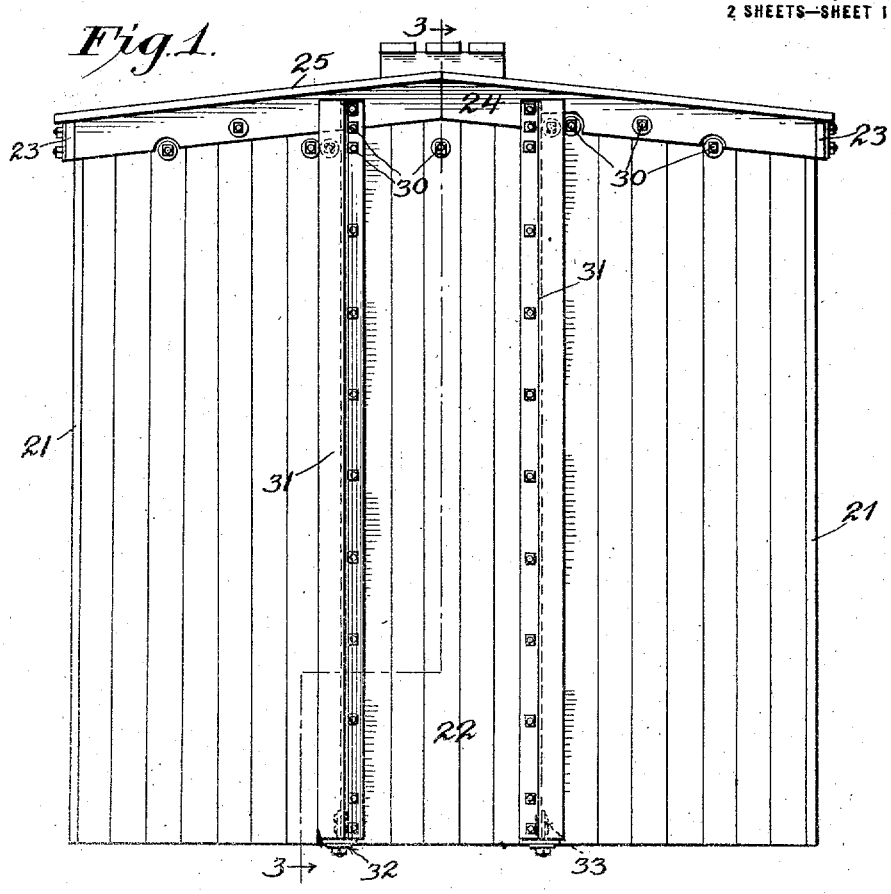
Figure 2:
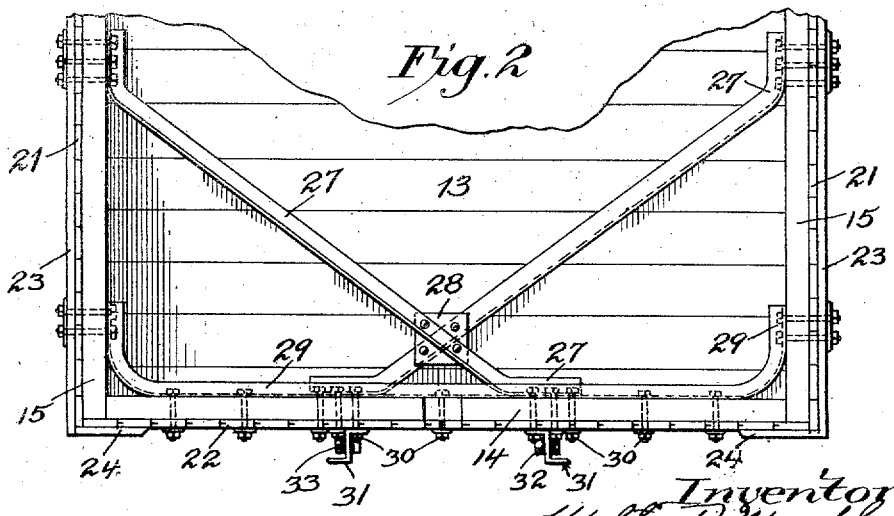
Figures 3, 4, 5, 6:
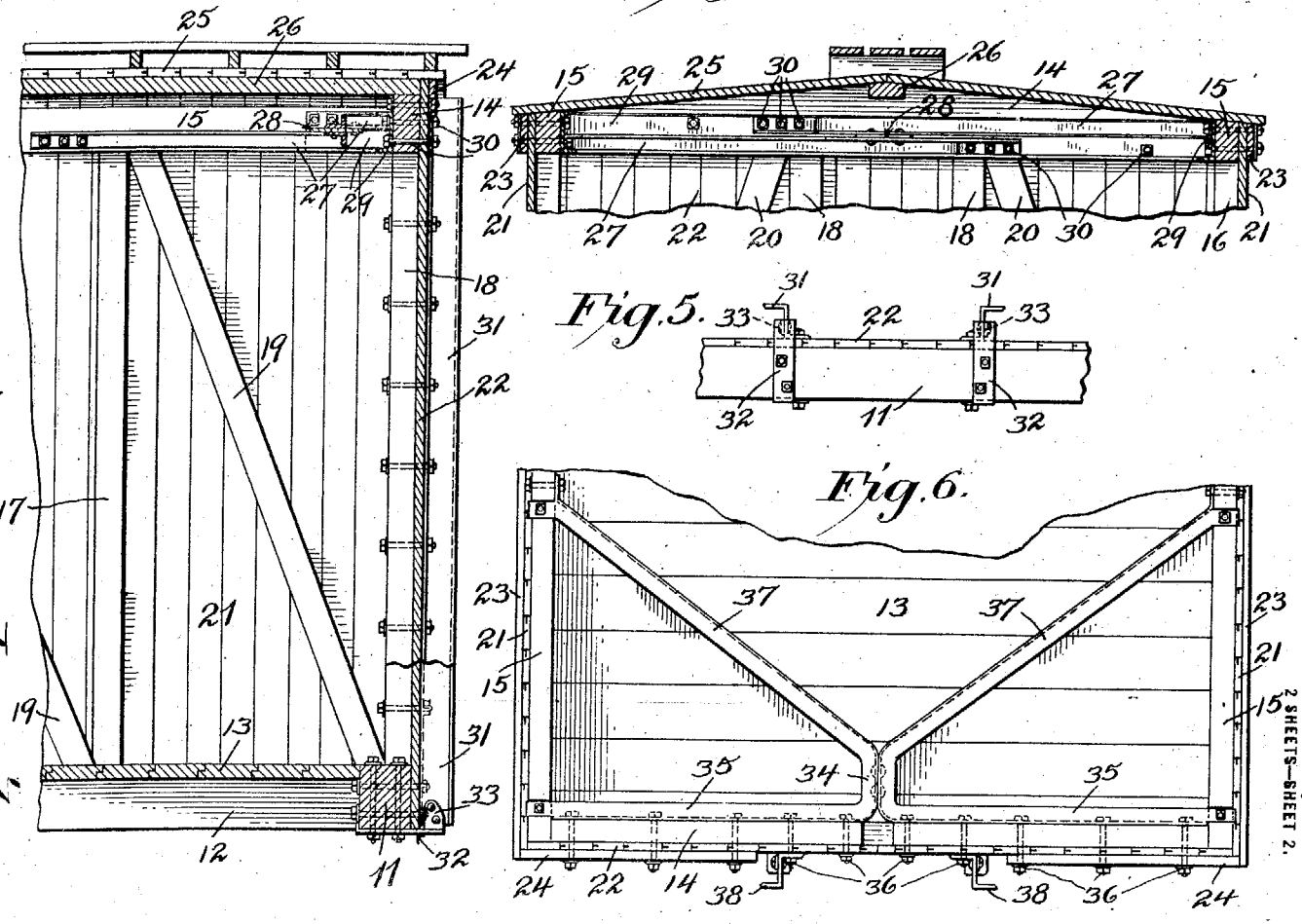

In the drawings, in which the same reference characters designate like parts in the several views, Figure 1 is an end elevation of the car body; Fig. 2 is a plan view of the same, the roof being removed; Fig. 3 is a longitudinal section of the same on the line 3—3 in Fig. 1; Fig. 4 is an inside view of the top portion of the end of the car, showing the side walls and roof in section; Fig. 5 is a bottom view of the middle portion of the end of the car, showing the end sill and metal brace connections; and Fig. 6 is a plan view of the end of the car with the roof removed, showing another form of the invention.

Referring to the drawings, the car illustrated therein comprises a wood end sill 11 and center and side sills 12 supporting the flooring 13. The end plate 14 and side plates 15 are supported by means of corner posts 16 and side and end posts 17 and 18 which have their lower ends secured to the side and end sills, respectively. Diagonal side corner braces 19 extend from the ends of the end sill to the side plates at the tops of the first pair of side posts 17, and diagonal end corner braces 20 extend from the ends of the end-sill to the end plate at the tops of the end posts 18. The side sheathing boards 21 and end sheathing boards 22 are secured to the plates and sills outside of the side and end posts and diagonal corner braces. Side and end fascia boards, 23, 24, which are nailed to the side plates and end places respectively, cover the upper ends of the sheathing boards. The roof sheathing 25 is supported on the side plates and ridge pole 26.

A wood frame car, such as those shown and described herein, shrinks and warps from changes in climatic conditions, and gets racked to pieces in service. Often the rickety condition of the car frame causes the roof to leak, and thereby permits the lading to become damaged. Moreover, the ends of such a car, even when lined with planking, are not strong enough to resist the battering to which they are not infrequently subjected from shifting lading. In order to strengthen the car end and stiffen the car frame, a rigid end roof brace, made of horizontally disposed crossed angle irons 27 is secured to the side plates 15 and end plate 14. The angle irons are riveted to a gusset plate 28 where they cross, near their ends which are secured to the end plate. The other ends of the angle irons are bent parallel to the side plates and are securely bolted to the inside faces thereof. On the inside of the end plate 17 opposite the ends of the crossed angles 27 is a channel iron stiffener 29, bolted to the ends of the angles and end plate by through bolts 30. The ends of the stiffener are bent around and bolted to the inside faces of the side plates.

On the outside of the end of the car there are arranged two vertical braces consisting of Z-bars 31, which extend from the end sill to the end plate at the end posts. At their lower ends the Z-bars are bolted to the end sill, and are also secured by means of strap hooks 32 bolted beneath the end sill, and having lugs 33 to which the lower ends of the Z-bars are bolted. The lower ends of the Z-bars are thus connected very securely to the car underframe. The Z-bars are bolted through the end sheathing to the end posts from top to bottom, and their upper ends are secured to the stiffener 29 and to the end plate by means of the through bolts 30. The upper ends of the Z-bars are thereby braced against being thrust outwardly. The trussed frame formed by the channel stiffener 29 and angle irons 27 is so constructed as to be readily bolted to the side plates, end plate and end braces, and thereby prevents distortion of the end of the car and roof.

In the form of the invention illustrated in Fig. 6 the trussed frame 34 for bracing the side plates and end plate consists of two bent angle irons secured together back to back near their middles, and having their ends secured to the side plates. The two branches of the bent angle irons diverge from the middle of the car toward the side plates. One branch 35 of each angle iron is disposed parallel to the end plate and is secured thereto by through bolts 36. The other branch 37 of each angle iron crosses the corner of the car diagonally, and is bolted to the side plate at a point removed from the end plate. The frame 34 is secured to Z-bars 38 on the end of the car similar to the Z-bars 31 of the construction shown in Figs. 1 to 5 inclusive. The diagonal portions 37 of the frame 34 hold the side plates and end plate together and brace them against angular deformation, and also rigidly support the top ends of the Z-bars, thereby stiffening the roof of the car as well as the end.

From the above description it is evident that the metal frame and its connections to the wood framework of the car braces the end of the car and the end portions of the car sides and roof, against the forces which tend to burst out the end of the car or cause the roof to leak, however they may be applied.

The invention is not restricted to the detail constructions shown and described, nor to cars having wooden framing arranged as shown and described.

What I claim as my invention is as follows:

1. In combination in a car having side and end plates, a rigid frame secured to the end plate and extending from side plate to side plate, said frame comprising diagonal braces meeting and rigidly connected at points intermediate their ends at the middle of the car and connected at their divergent ends to the side plates and to the end plate.

2. In combination in a car having side and end plates and corner braces therefor, a brace from side plate to side plate secured thereto and to the end plate, said brace comprising two portions secured together at the middle of the car and diverging therefrom, the diverging ends being secured to the end plate on each side of its middle and to the side plates at opposite points away from the ends of said end plate.

3. In combination in a car having side and end plates, a frame extending from side plate to side plate comprising a pair of braces secured to the end plate and having diagonal portions connected at their ends to the side plates, and a rigid connection between said braces at points intermediate their ends for maintaining the end plate square with the ends of said side plates.

4. In combination in a car having side and end plates, a brace for said end plate connecting side plate to side plate, and a rigid frame secured to said end plate at its middle and connected to said side plates at points removed from their ends.

5. In combination in a car having side and end plates, an end brace from side plate to side plate comprising diagonal legs secured together intermediate their ends and rigidly connecting the side plates to the end plate for maintaining them at right angles.

6. In combination in a car having side and end plates, a rigid frame spanning from side plate to side plate, connecting the side plates to the end plate and comprising two pairs of divergent members, one pair rigidly connected with the end plate of the car and the members of said other pair of members rigidly connected with the side plates respectively.

7. In combination in a car having side and end plates, a truss frame spanning from side plate to side plate comprising diagonal members having portions parallel to the end plate, said members being rigidly secured together and to the end plate and having their ends secured to the side plates.

8. A metal frame for a car end brace, said frame having a pair of intersecting horizontal members rigidly connected together, the ends of said frame members being adapted for bolting on to the inside of the end plate and inside ends of the side plates of a wooden car.

9. In a car end construction, in combination with end sill, side plate and end plate, a pair of diagonal end braces, each of which is secured to said end plate and end of said side plate and which are rigidly secured together between their ends and means for supporting said braces from the end sill.

10. In a car end construction, in combination with side plates, end plate, end sill and end posts, a pair of end braces which are secured to said end plate and sill and to said end posts respectively, and a rigid frame comprising two pairs of divergent members, one pair rigidly connected with said end plate and end braces, the members of said other pair of members rigidly connected with the side plates respectively for maintaining said side and end plates in rectangular alinement.

11. In a car end construction, in combination with side plates, end sill and end plate, a pair of end braces, each of which is secured to said end plate and end sill, a brace secured to said end braces and to said end plate, and a pair of diagonal braces rigidly secured together at points intermediate their extremities to said end plate and each of which is rigidly secured to one of said side plates.

12. In a car end construction in combination with end braces, sill and end plates, a pair of diagonal cross braces which are secured to said side and end plates and which support the upper ends of said braces, and means connecting the diagonal braces near their meeting whereby the end plate and ends of said end braces are maintained in alinement.

WALTER P. MURPHY.